(12) United States Patent
Thompson (10) Patent No.: US 10,053,803 B2
(45) Date of Patent: Aug. 21, 2018

(54) MODULAR ATTACHMENT SYSTEM AND METHOD

(75) Inventor: Jesse B. Thompson, North Bend, WA (US)

(73) Assignee: Jelis Incorporated, North Bend, WA (US)

( * ) Notice: Subject to any disclaimer, the term of this patent is extended or adjusted under 35 U.S.C. 154(b) by 1925 days.

(21) Appl. No.: 12/265,612

(22) Filed: Nov. 5, 2008

(65) Prior Publication Data

US 2009/0117300 A1    May 7, 2009

Related U.S. Application Data

(60) Provisional application No. 60/985,605, filed on Nov. 5, 2007.

(51) Int. Cl.
*B32B 3/06* (2006.01)
*D03D 15/00* (2006.01)
(Continued)

(52) U.S. Cl.
CPC ......... *D03D 15/00* (2013.01); *A41D 31/0005* (2013.01); *A45F 5/02* (2013.01); *B32B 3/263* (2013.01); *B32B 5/024* (2013.01); *B32B 5/06* (2013.01); *B32B 5/26* (2013.01); *B32B 15/02* (2013.01); *B32B 15/14* (2013.01); *B32B 21/10* (2013.01); *B32B 27/12* (2013.01); *B32B 27/32* (2013.01); *B32B 27/34* (2013.01); *B32B 27/36* (2013.01); *D03D 1/04* (2013.01); *D03D 15/0088* (2013.01); *F41H 1/02* (2013.01); *A41D 27/22* (2013.01); *B32B 2262/02* (2013.01); *B32B 2262/0253* (2013.01); *B32B 2262/0261* (2013.01); *B32B 2262/0276* (2013.01); *B32B 2307/546* (2013.01); *B32B 2307/726* (2013.01); *B32B 2307/7265* (2013.01);
(Continued)

(58) Field of Classification Search
CPC ......... A41D 13/0012; A45F 5/02; A45F 5/00; A45F 2003/146; A45F 5/021; A45C 13/20; A45C 13/30; B29C 70/226; D03D 15/0088; D04H 3/04; D04H 3/115; Y10S 24/31
USPC .................................................. 442/185, 186
See application file for complete search history.

(56) References Cited

U.S. PATENT DOCUMENTS 4,680,213 A * 7/1987 Fourezon ....................... 428/105
5,724,707 A   3/1998 Kirk et al.
(Continued)

FOREIGN PATENT DOCUMENTS

DE            10257778 A1 * 6/2004

OTHER PUBLICATIONS

All-Purpose Lightweight Individual Carrying Equipment, Wkipedia, http://en.wikipedia.org/wiki/All-purpose_Lightweight_Individual_Carrying_Equipment, Aug. 18, 2009.
(Continued)

*Primary Examiner* — Elizabeth M Cole
(74) *Attorney, Agent, or Firm* — Lowe Graham Jones PLLC (57) ABSTRACT

Modular attachment systems comprising an interwoven material matrix which comprises a plurality of loops and one or more modular attachment accessories, each of which comprises a coupling mechanism for attaching the modular attachment accessory to one or more of the plurality of loops of the interwoven material matrix, are disclosed.

27 Claims, 11 Drawing Sheets

(51) Int. Cl.

| | |
|---|---|
| *A41D 31/00* | (2006.01) |
| *A45F 5/02* | (2006.01) |
| *B32B 5/26* | (2006.01) |
| *D03D 1/04* | (2006.01) |
| *F41H 1/02* | (2006.01) |
| *B32B 5/02* | (2006.01) |
| *B32B 5/06* | (2006.01) |
| *B32B 15/02* | (2006.01) |
| *B32B 15/14* | (2006.01) |
| *B32B 21/10* | (2006.01) |
| *B32B 27/12* | (2006.01) |
| *B32B 27/32* | (2006.01) |
| *B32B 27/34* | (2006.01) |
| *B32B 27/36* | (2006.01) |
| *B32B 3/26* | (2006.01) |
| *A41D 27/22* | (2006.01) |

(52) U.S. Cl.
CPC ....... *B32B 2437/00* (2013.01); *B32B 2571/00* (2013.01); *D10B 2101/20* (2013.01); *D10B 2321/022* (2013.01); *D10B 2331/02* (2013.01); *D10B 2331/04* (2013.01); *D10B 2501/04* (2013.01); *Y10T 29/49826* (2015.01); *Y10T 428/1334* (2015.01); *Y10T 428/24008* (2015.01); *Y10T 428/24017* (2015.01); *Y10T 442/3033* (2015.04)

(56) References Cited

U.S. PATENT DOCUMENTS

| | | | |
|---|---|---|---|
| 6,823,566 B2 | 11/2004 | Coffey | |
| 7,200,871 B1 | 8/2007 | Carlson | |
| 2006/0242799 A1* | 11/2006 | Flossner | 24/3.7 |
| 2007/0158380 A1* | 7/2007 | Calkin | 224/675 |
| 2008/0078701 A1* | 4/2008 | Carr et al. | 209/313 |
| 2009/0039122 A1* | 2/2009 | Antonioni | 224/250 |

OTHER PUBLICATIONS

Pouch Attachment Ladder System, Wkipedia, http://en.wikipedia.org/wiki/Pouch_Attachment_Ladder_System, Sep. 2, 2009.
Protech Trimax Tactical Vest, Level IIIA, Chief Supply, http://www.chiefsupply.com/Law_Enforcement/Body_Armor/Tactical_Body_Armor/TRIMAX, Sep. 9, 2009.
Serpa Platform Ambidextrous, Blackhawk, http://www.blackhawk.com/product/SERPA-Platform-Ambidextrous, 772,58. htm, Sep. 9, 2009.
G-Code RTI MOLLE Claw 2, Eagle Instrustries, http://www.eagleindustries.com/product.php?productid=16210&cat=93&page=1, Sep. 25, 2009.

* cited by examiner

MODULAR ATTACHMENT SYSTEM AND METHOD

PRIORITY CLAIM

This application is related to and claims the benefit of U.S. Provisional Application 60/985,605 filed Nov. 5, 2007, the disclosure of which is incorporated herein by reference in its entirety.

FIELD OF THE INVENTION

This invention relates generally to devices and methods for carrying items, and more specifically, to systems and methods for modular attachment.

BACKGROUND OF THE INVENTION

Systems exist presently that allow a user to couple various types of carrying accessories to an article of clothing being worn by the user. Typically, individual horizontal strips of fabric sewn to the article of clothing form loops, and carrying accessories that have straps can be passed through the loops to couple the accessory to the clothing. These typical systems are deficient because they only allow carrying accessories to be coupled to the article of clothing or other articles in limited orientations and locations.

SUMMARY OF THE INVENTION

Modular attachment systems comprising an interwoven material matrix which comprises a plurality of loops and one or more modular attachment accessories, each of which comprises a coupling mechanism for attaching the modular attachment accessory to one or more of the plurality of loops of the interwoven material matrix, are disclosed.

In one embodiment, the interwoven material matrix of the modular attachment system comprises a plurality of ribbons, ropes or strips of material interwoven to form the plurality of loops.

In another embodiment, the interwoven material matrix of the modular attachment system comprises a first set of fabric strips interwoven in a perpendicular arrangement with a second set of fabric strips to form the plurality of loops.

Various materials can be used to make the interwoven material matrix of the modular attachment system. In general, any fabric or flexible material, including any woven natural or man-made materials, for example, various fabrics such as nylon, polyester, polypropylene and the like, can be employed. Other suitable materials include plastics, metals and wood strips.

Functionally, the modular attachment system of the present invention can be attached to or incorporated into various articles such as backpacks, body armor, pouches, vests and the like. This allows various modular attachment accessories to be attached to the article using a coupling mechanism. Typical modular attachment accessories for use in the modular attachment system of the present invention include, for example, pouches, clips, bladders, badges, holsters, pockets, trays, organizers, body armor additions or extensions, electronic devices and the like. In addition to their use in wearable items such as backpacks, body armor, pouches and vests, it should be understood that the modular attachment system of the present application can be adapted for numerous other purposes, including without limitation pocket shelves for electronics or lighting, tradeshow and architectural panels that need attachment options and the like.

The modular attachment system of the present invention provides a number of notable advantages when compared with existing systems. Most significantly, the modular attachment system of the present invention allows the attachment of modular attachment accessories in any orientation and location in relation to a body, including vertical, horizontal, any irregular orientation, and the like, while existing systems only allow carrying accessories to be attached in limited orientations and locations, typically only a single vertical orientation. Also, the modular attachment system of the present invention can be manufactured more easily and cheaply than existing systems, which typically require that each attachment portion of a strip of material be bar tacked, affixed, sewn, riveted or bonded to a backing material to create individual "loops," with such attachments occurring at junctions that rely on those physical or chemical bonds and the strength of the backing material for the strength of the system. Furthermore, since the module attachment system of the present invention does not need a backing material for stability or strength, wearable items such as backpacks, body armor, pouches and vests are lighter and more flexible and therefore fit better and closer to the body and have breathability advantages when compared to existing systems.

BRIEF DESCRIPTION OF THE DRAWINGS

Preferred and alternative embodiments of the present invention are described in detail below with reference to the following drawings. These depict particular embodiments of the invention and are not intended to limit the scope of the invention as set forth in the claims.

DETAILED DESCRIPTION OF THE PREFERRED EMBODIMENTS

Illustrative embodiments presented herein include, but are not limited to, systems and methods for modular attachment.

Various aspects of the illustrative embodiments will be described using terms commonly employed by those skilled in the art to convey the substance of their work to others skilled in the art. However, it will be apparent to those skilled in the art that the embodiments described herein may be practiced with only some of the described aspects. For purposes of explanation, specific numbers, materials and configurations are set forth in order to provide a thorough understanding of the illustrative embodiments. However, it will be apparent to one skilled in the art that the embodiments described herein may be practiced without the specific details. In other instances, well-known features are omitted or simplified in order not to obscure the illustrative embodiments.

Further, various operations and/or communications will be described as multiple discrete operations and/or communications, in turn, in a manner that is most helpful in understanding the embodiments described herein; however, the order of description should not be construed as to imply that these operations and/or communications are necessarily order dependent. In particular, these operations and/or communications need not be performed in the order of presentation.

The phrase "in one embodiment" is used repeatedly. The phrase generally does not refer to the same embodiment; however, it may. The terms "comprising," "having" and "including" are synonymous, unless the context dictates otherwise.

Figure 1:
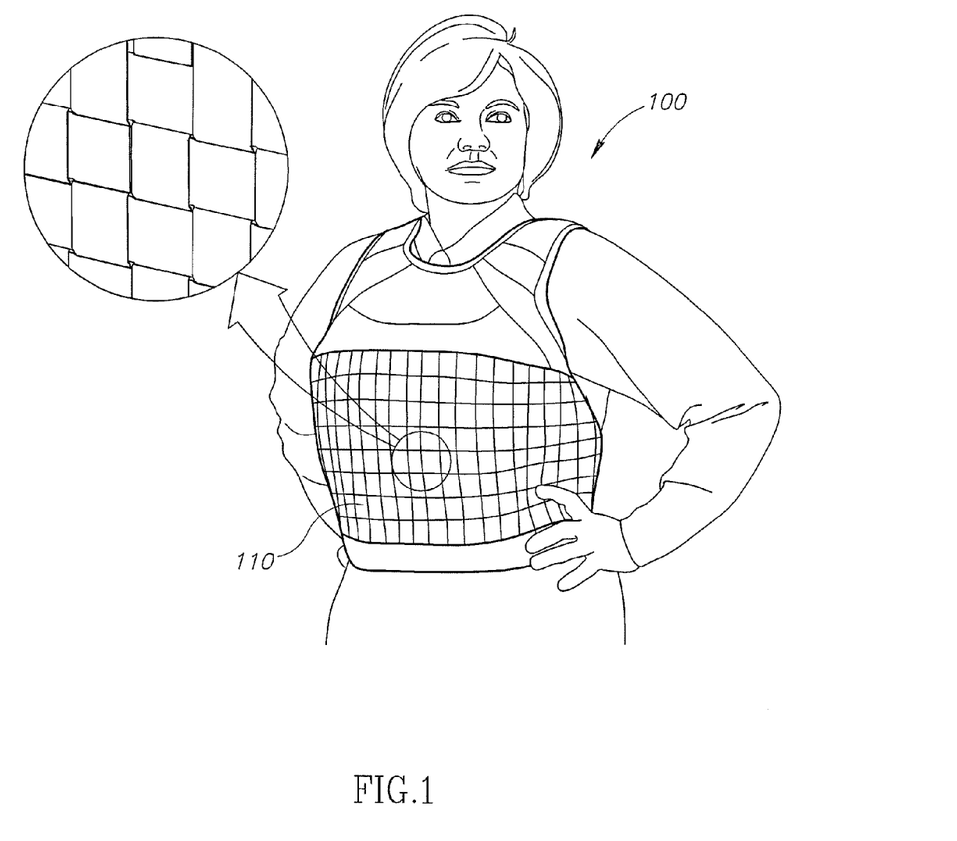
FIG. 1 is an environmental view of a modular attachment system embodied in body armor, in accordance with various embodiments.

Referring now to FIG. 1, an environmental view of a modular attachment system 100 embodied in body armor, in accordance with various embodiments, is shown. The modular attachment system 100 includes an interwoven material matrix 110 that provides a substrate and one or more modular attachment accessories that can be coupled to the interwoven material matrix 110. Illustrative modular attachment accessories include those depicted in FIGS. 4, 5, 6 and 7 and are discussed hereinbelow. Although the present embodiment depicts a modular attachment system 100 embodied in body armor, one of ordinary skill in the art will appreciate that such a system can be embodied in a wide variety of articles, including backpacks, vests, pants, hats, and the like.

Figure 2:
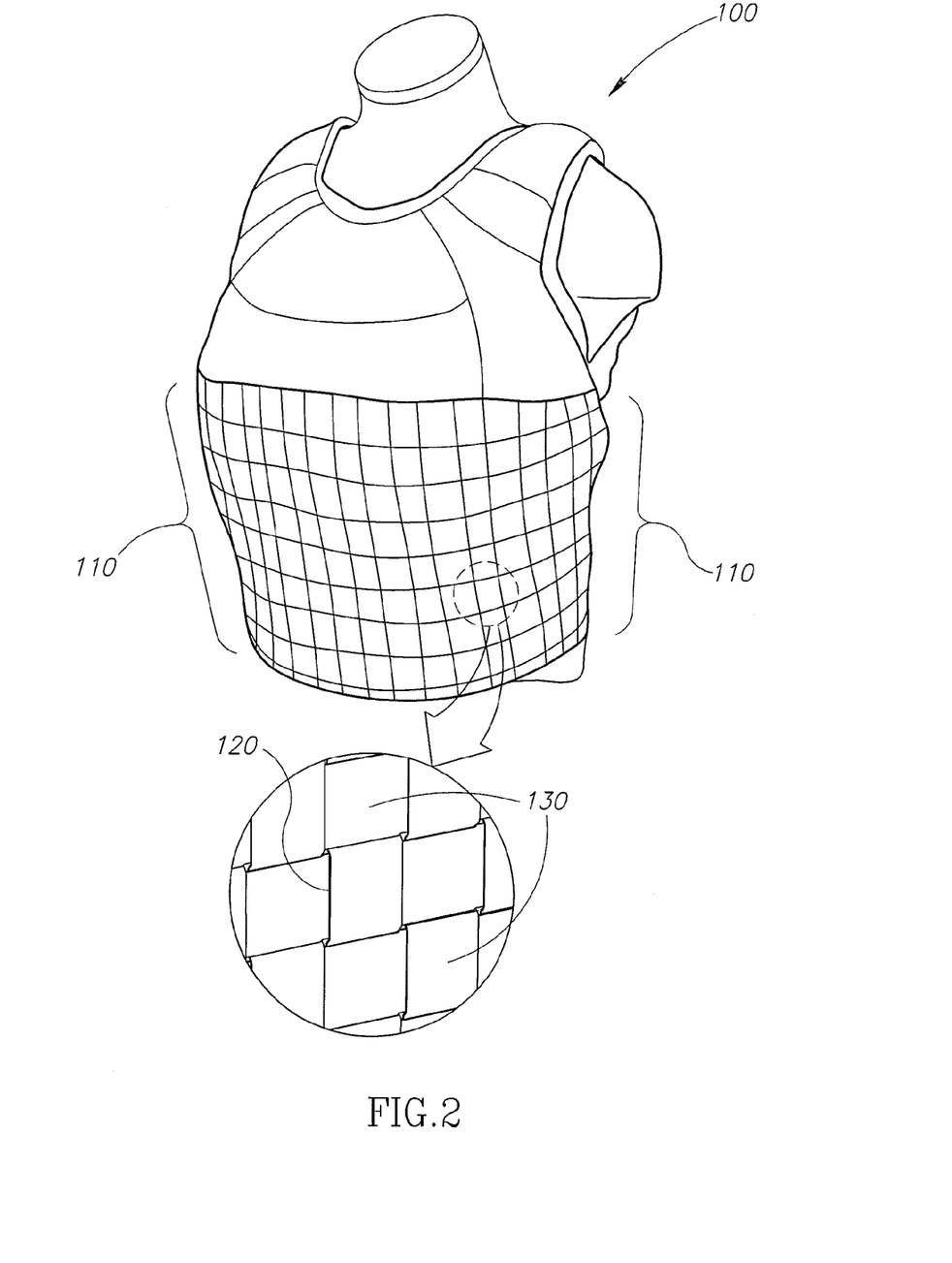
FIG. 2 is an environmental front view of a modular attachment system embodied in body armor, in accordance with various embodiments.

Referring now to FIG. 2, an environmental front view of the modular attachment system 100 depicted in FIG. 1 and embodied in body armor, in accordance with various embodiments, is shown. The modular attachment system 100, as described herein, comprises the interwoven material matrix 110 that provides a substrate comprising a plurality of loops 120, and one or more modular attachment accessories such as those depicted in FIGS. 4, 5, 6 and 7 that can be coupled to one or more of the plurality of loops 120 of the interwoven material matrix 110. In the illustrated embodiment, the interwoven material matrix 110 comprises strips of a material 130 woven together into webbing to form the interwoven material matrix 110. The loops 120 of the interwoven material matrix 110 are formed at the exposed portions where the strips of the interwoven material 130 intersect. As depicted in FIG. 2, the interwoven material matrix 110 can be configured such that the interwoven material 130 of the interwoven material matrix 110 is relatively parallel or perpendicular in relation to the wearer of the body armor or other article; however, in another embodiment, the interwoven material matrix 110 can be in any orientation. Additionally, the interwoven material matrix 110 can be of any size and will vary based on various factors such as the intended application, the number of modular attachment accessories to be attached to interwoven material matrix 110 and the like. The individual pieces of the interwoven material 130 that comprises the interwoven material matrix 110 can be of any desired thickness, diameter, length, width and the like and will vary depending on various factors such as the intended application, the required strength for the intended application, the number of modular attachment accessories to be attached to the interwoven material matrix 110 and the like. In general, the individual pieces of the interwoven material 130 can range from about 5 millimeters to about 100 millimeters, preferably from about 20 millimeters to about 25 millimeters, in width, from about 0.1 millimeter to about 5 millimeters in thickness and from about 2 millimeters to about 20 millimeters in diameter. Moreover, the individual pieces of the interwoven material 130 that comprise the interwoven material matrix 110 can be any desired shape, including a ribbon, strip, rope and the like. Various materials can be used to make the interwoven material 130 that is used to construct the interwoven material matrix 110. In general, any fabric or flexible material, including any woven natural or man-made materials, for example, various fabrics such as nylon, polyester, polypropylene and the like, can be employed, with a preferred material being 1000 denier nylon, which is commonly known as a flexible, non-elastic fabric that is used for outdoor products such as backpacks and the like. Other suitable materials include plastics, metals and wood strips.

Figure 3:
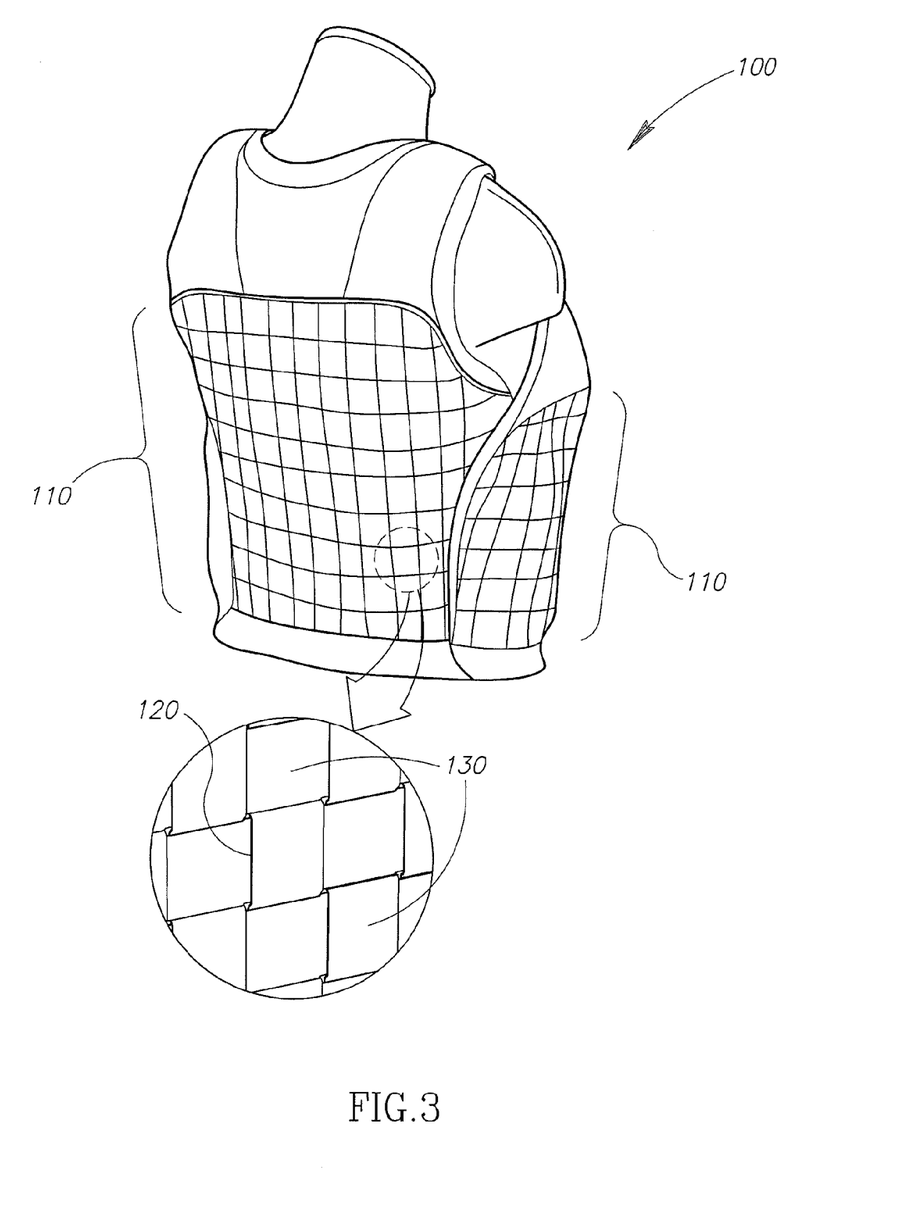
FIG. 3 is an environmental back view of a modular attachment system embodied in body armor, in accordance with various embodiments.

Referring now to FIG. 3, an environmental back view of the modular attachment system 100 depicted in FIG. 1 and embodied in body armor, in accordance with various embodiments, is shown. As set forth above, the modular attachment system 100 includes the interwoven material matrix 110, the plurality of loops 120 and the interwoven material 130. As depicted in FIGS. 2 and 3, the interwoven material matrix 110 can be embodied in body armor and can cover any part of the body including the front torso, back, shoulders, and the like.

Figure 4:
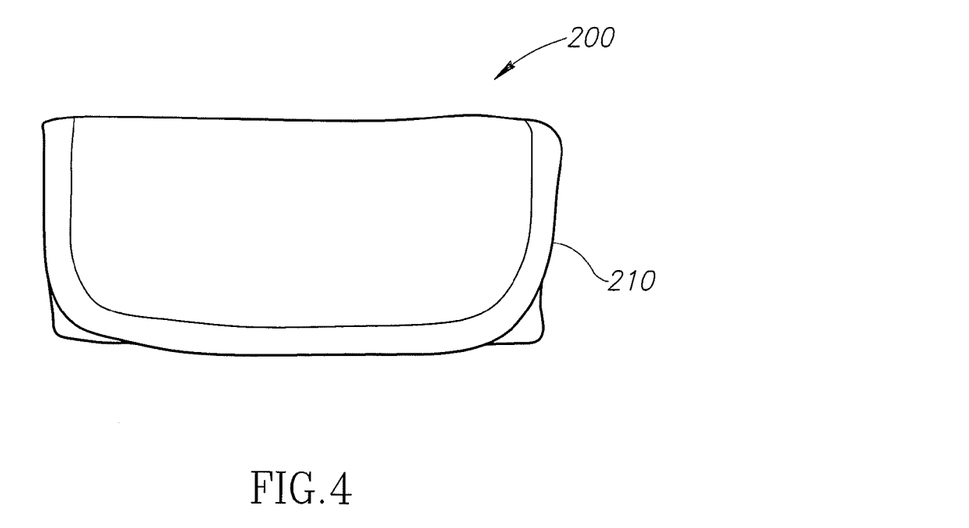
FIG. 4 is a front view of a modular attachment accessory pouch system, in accordance with various embodiments.
Figure 5:
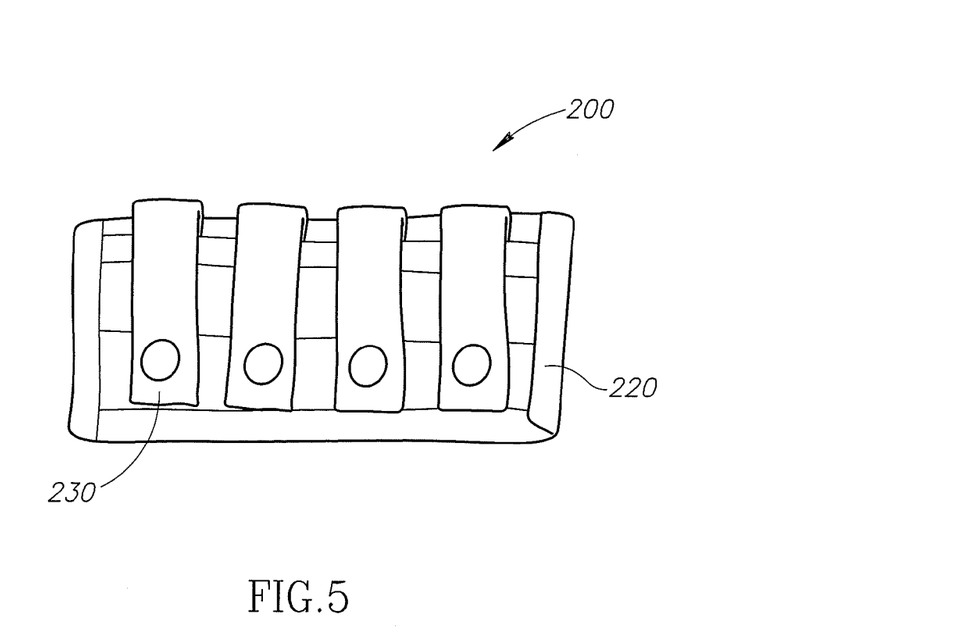
FIG. 5 is a back view of a modular attachment accessory pouch system, in accordance with various embodiments.

Referring now to FIGS. 4 and 5, a front view (FIG. 4) and a back view (FIG. 5) of an exemplary modular attachment accessory 200, in accordance with various embodiments, is shown. As depicted in the embodiment illustrated in FIGS. 4 and 5, the modular attachment accessory 200 comprises a pouch 210 having a flap closure and a plurality of straps 220 that couple to the rear of the pouch 210 via snaps 230. In one embodiment of the present invention, one or more of the straps 220 can be passed through one or more of the plurality of loops 120 of the interwoven material matrix 110 and the snaps 230 can be used to create a closed loop in the strap 220 and thereby couple the modular attachment accessory 200 to the interwoven material matrix 210.

Figure 6:
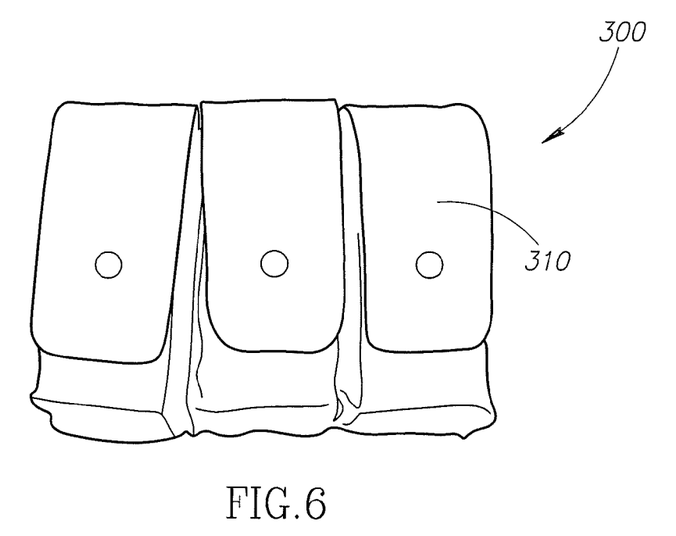
FIG. 6 is a front view of an alternative modular attachment accessory pouch system, in accordance with various embodiments.
Figure 7:
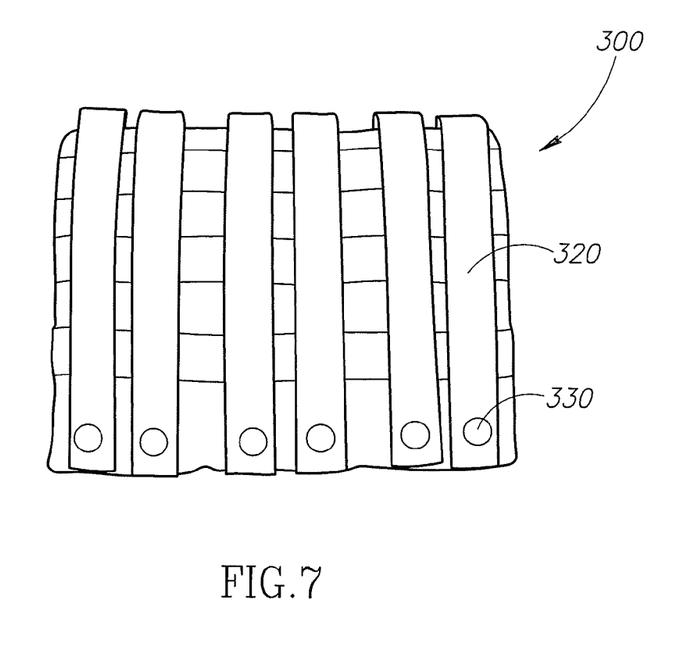
FIG. 7 is a back view of an alternative modular attachment accessory pouch system, in accordance with various embodiments.

Referring now to FIGS. 6 and 7, a front view (FIG. 6) and a back view (FIG. 7) of an alternative exemplary modular attachment accessory 300, in accordance with various embodiments, is show. As depicted in the embodiment illustrated in FIGS. 6 and 7, the modular attachment accessory 300 comprises a plurality of pouches 310 having snap closures and a plurality of straps 320 that couple to the rear of the pouch via snaps 330. In one embodiment of the present invention, one or more of the straps 320 can be passed through one or more of the plurality of loops 120 of the interwoven material matrix 110 and the snaps 330 can be used to create a closed loop in the strap 320 and thereby couple the second modular attachment accessory 300 to the interwoven material matrix 110.

It should be understood that the plurality of loops 120 of the interwoven material matrix 110 permits great flexibility in the attachment of modular attachment accessories. Accordingly, in one embodiment, one or more modular attachment accessories such as the modular attachment accessory 200 and the modular attachment accessory 300 can be coupled to the interwoven material matrix 110 in any orientation in relation to a body, including vertical, horizontal, any irregular orientation, and the like.

In a further embodiment, any type of coupling mechanism, device or means can be used to facilitate coupling of one or more modular attachment accessories to the interwoven material matrix 110, including hooks, straps, carabiners, buttons, clips, snaps and the like and combinations thereof.

In another embodiment, modular attachment accessories that are utilized in various modular attachment system, such as Modular Lightweight Load-carrying Equipment ("MOLLE"), All-Purpose Lightweight Individual Carrying Equipment ("ALICE"), Individual Integrated Fighting System ("II FS"), Personal Load Carrying Equipment ("PLCE"), or Improved Load Bearing Equipment ("ILBE"), can be used in conjunction with the interwoven material matrix 110 of the present invention.

Figure 8:
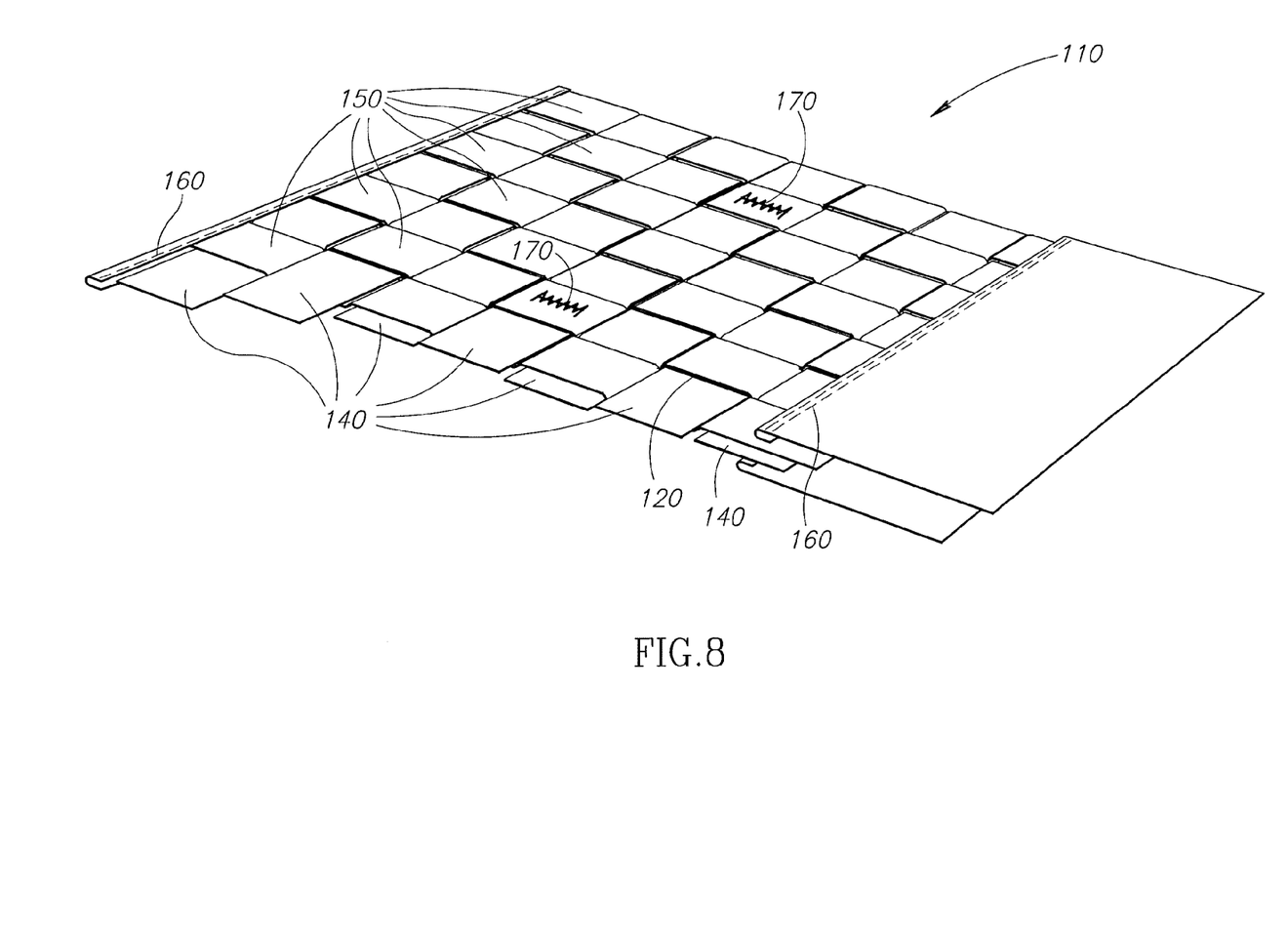
FIG. 8 is a cross-sectional view an interwoven material matrix, in accordance with various embodiments.

Referring now to FIG. 8, a cross-sectional view of the interwoven material matrix 110, in accordance with various embodiments, is shown. As depicted in the illustrated embodiment, a first set of strips of material 140 are arranged flat and parallel to one another and interwoven in a perpendicular arrangement with a second set of strips of material 150 to form the interwoven material matrix 110 containing the plurality of loops 120. Stitching 160 at the peripheral edges is than used to secure the first set of strips of material 140 and the second set of strips of material 150 in the indicated configuration. If desired, additional tacking 170 can be used to provide further stability. In the illustrated embodiment, the individual strips in the first set of strips of material 140 and the second set of strips of material 150 have substantially the same thickness and width. However, if desired, the individual strips of material can vary in thickness and width, both within a set of strips and when compared with the strips of material in the other set of strips. In the illustrated embodiment, the individual strips of material within a set of strips are arranged so that each strip is in contact along its length with the two immediately adjacent parallel strips. However, if desired, the individual strips of material within a set of strips can be arranged so that there is spacing between each strip and one or both of the two immediately adjacent parallel strips. While the stitching pattern in the illustrated embodiment is a 1 over 1 plain weave, it should be understood that various other weaving patterns, for example a 2 over 1 plain weave or a 2 over 1 staggered twill weave can be use if desired for the intended application. In an alternative embodiment, the first set of strips of material 140 may be oriented at various angles relative to the second set of strips of material 150. In further embodiments, the strips within a set of strips of material are not all parallel to one another. The interwoven material matrix 110 can be made in large rolls and then cut to size and stitched at the peripheral edges as described above. Alternatively, large sheets of a fabric can be cut into strips, which can then be woven together to form the interwoven material matrix 110. In this instance, the resulting interwoven material matrix 110 will possess a uniform appearance that can provide superior camouflage characteristics for hunting and military applications.

Figure 9:
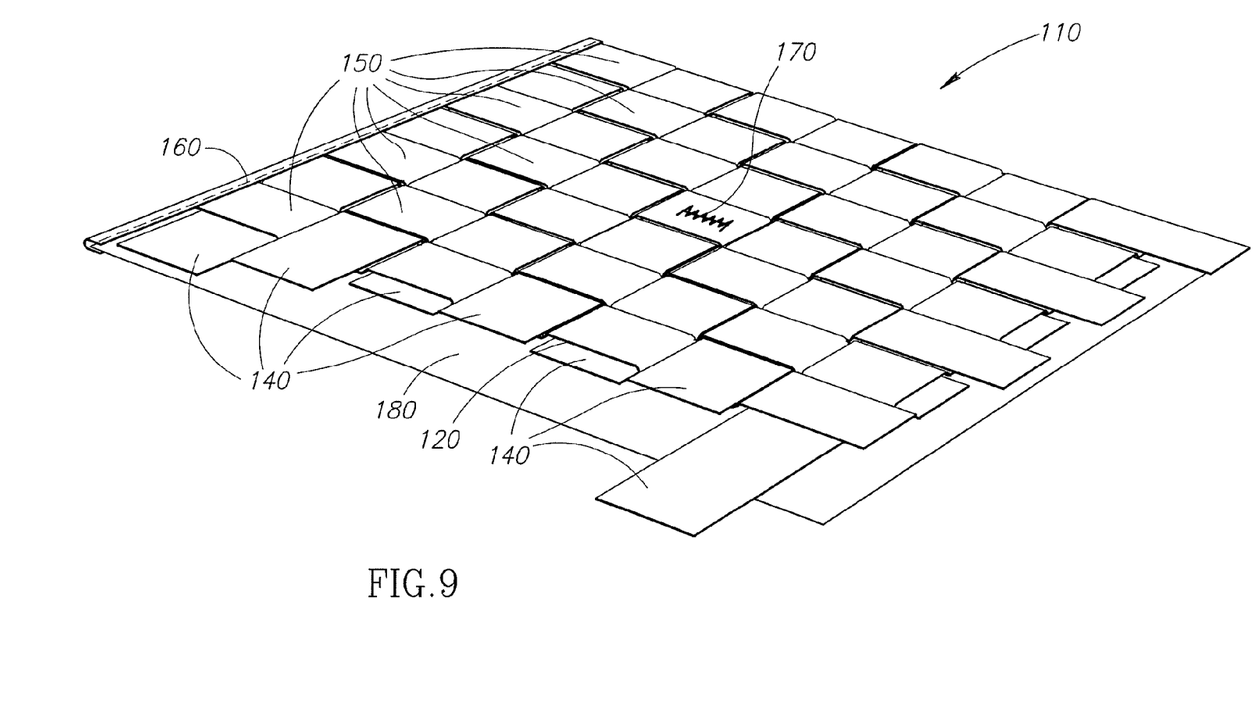
FIG. 9 is a cross-sectional view an interwoven material matrix attached to a backing material, in accordance with various embodiments.

Referring now to FIG. 9, a cross-sectional view the interwoven material matrix 110 attached to a backing material 180, in accordance with various embodiments, is shown. As set forth above, the interwoven material matrix 110 includes the plurality of loops 120, the first set of strips of material 140, the second set of strips of material 150, the stitching 160 and the additional tacking 170. The stitching 160 and the additional tacking 170, in addition to securing the first set of strips of material 140 and the second set of strips of material 150 in the indicated configuration, is also used to secure the backing material 180 to the interwoven material matrix 110. The backing material 180 can be of any desired thickness, length and width and will vary depending on various factors such as the intended application, the required strength for the intended application, the size of the interwoven material matrix 110 and the like. In general, the backing material can range from about 0.1 millimeters to about 5 millimeters in thickness. Various materials can be used to make the backing material 180, including, for example, various fabrics such as nylon, polyester and polypropylene. It should be understood that, unlike existing systems which require use of a backing material for strength and stability, the interwoven material matrix 110 by itself provides significant strength as a result of the perimeter stitching 160. Therefore, the backing material 180 is optional and not required for all applications. Furthermore, in those applications in which the backing material 180 is not required for strength and stability, a very thin backing material, such as a waterproof or water resistant material, or even a meshed backing material that allows water to flow through, can be used. On the other hand, if necessary or desired for the particular application, a thicker backing material can be used to impart additional strength and stability to the interwoven material matrix 110. As can be appreciated from FIGS. 8 and 9, the interwoven matrix 110 can be attached to the backing material 180 at the stitching 160 (i.e., the perimeter area of the matrix) whereby the first set of strips 140 and second set of strips 150 are substantially void (or completely void, in one embodiment discussed above) of attachment to the backing material 180 along lengths of the sets of strips. In other words, as further discussed herein, the non-elastic strips and the interwoven configuration of the matrix attached at the stitching perimeter area provide sufficient strength and stability to support the weight of the modular attachment accessories without requiring the strips to be attached to the backing material along the lengths of the strips of the matrix.

Figure 10:
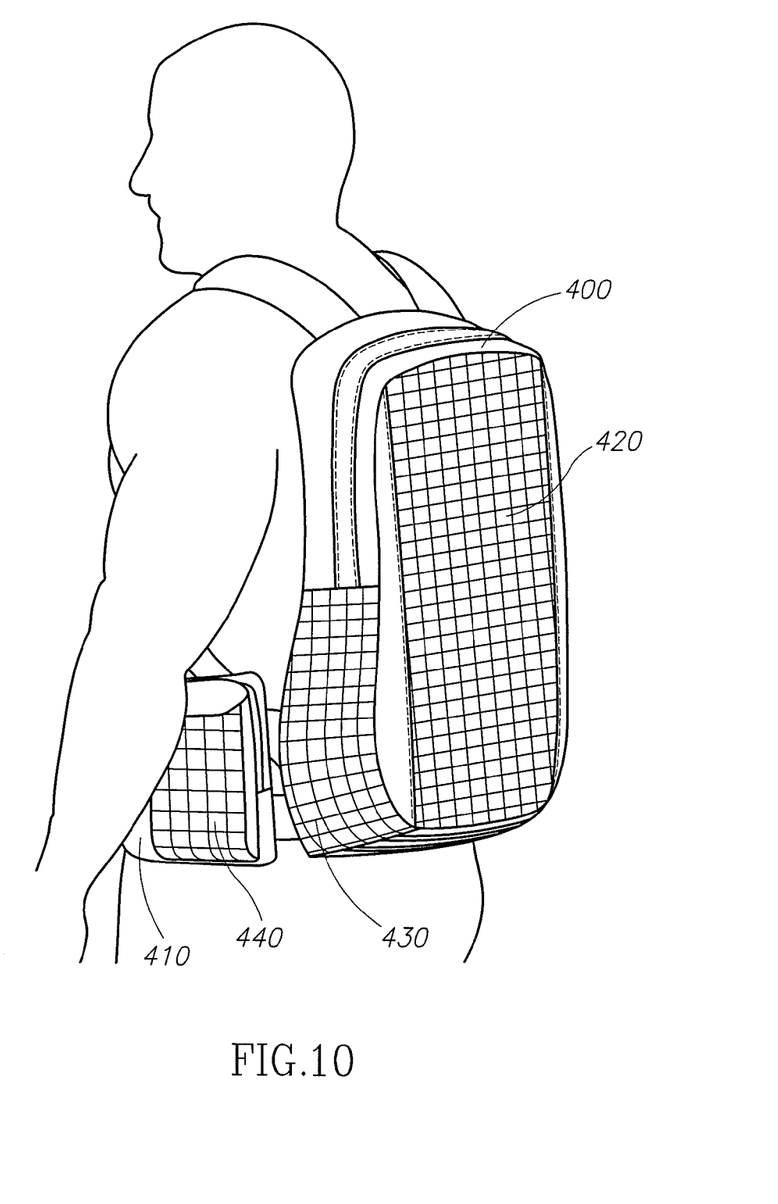
FIG. 10 is an environmental view of a modular attachment system embodied in a backpack, in accordance with various embodiments.

Referring now to FIG. 10, an environmental view of a modular attachment system 100 embodied in a backpack 400 and a pouch 410, in accordance with various embodiments, is shown. In the illustrated embodiment, the backpack 400 includes a first interwoven material matrix 420 mounted on the back of the backpack 400 and a second interwoven material matrix 430 mounted on the side of the backpack 400, while the pouch 410 includes an interwoven material matrix 440 mounted on the front of the pouch 410. The interwoven material matrices 420, 430 and 440 have the characteristics of the interwoven material matrix 110 discussed in detail hereinabove.

Figure 11A:
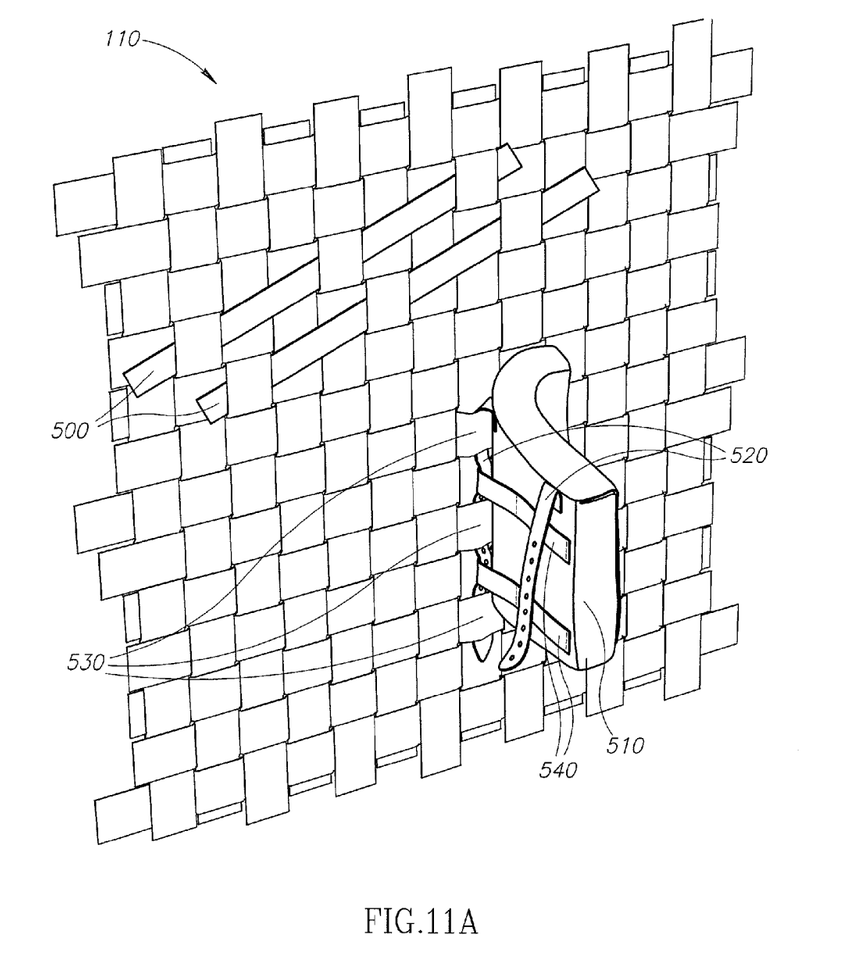
FIGS. 11A, 11B and 11C are isometric view of an interwoven material matrix having attached thereto several coupling mechanisms and modular attachment accessories in different orientations, in accordance with various embodiments.
Figure 11B:
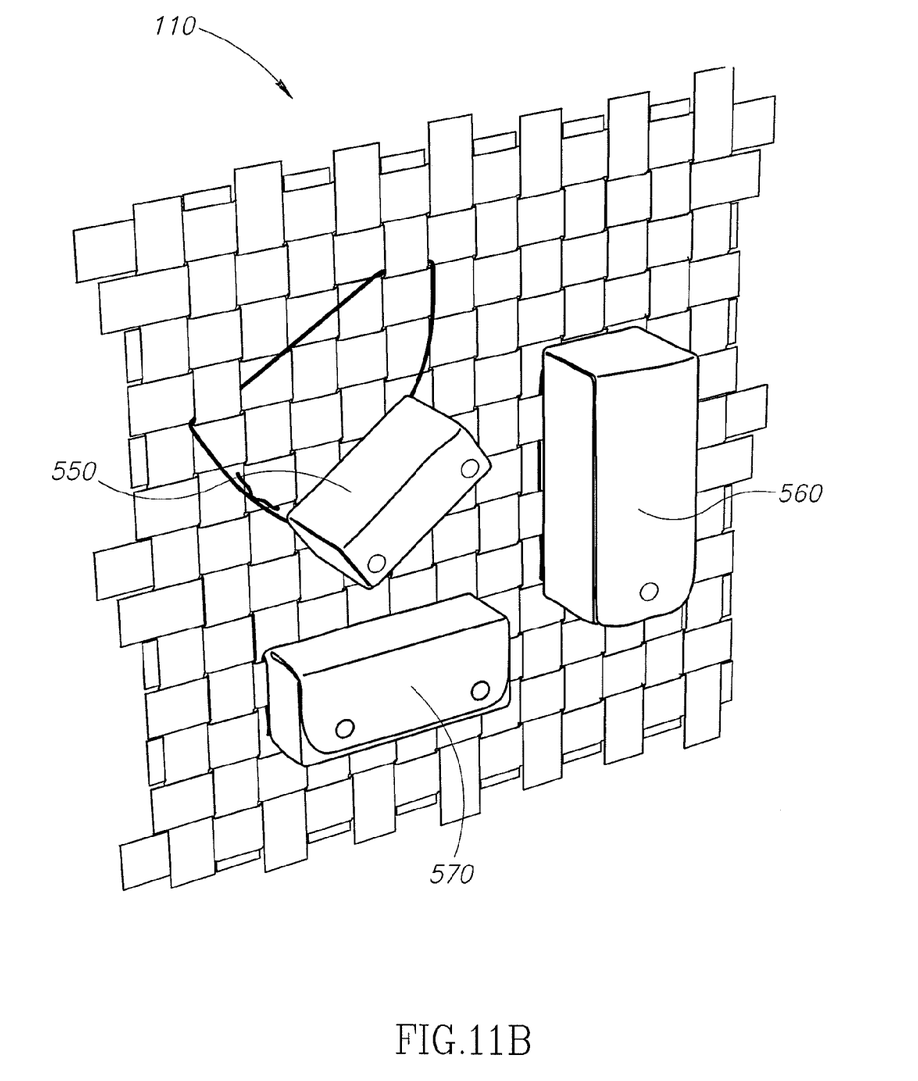
Figure 11C:
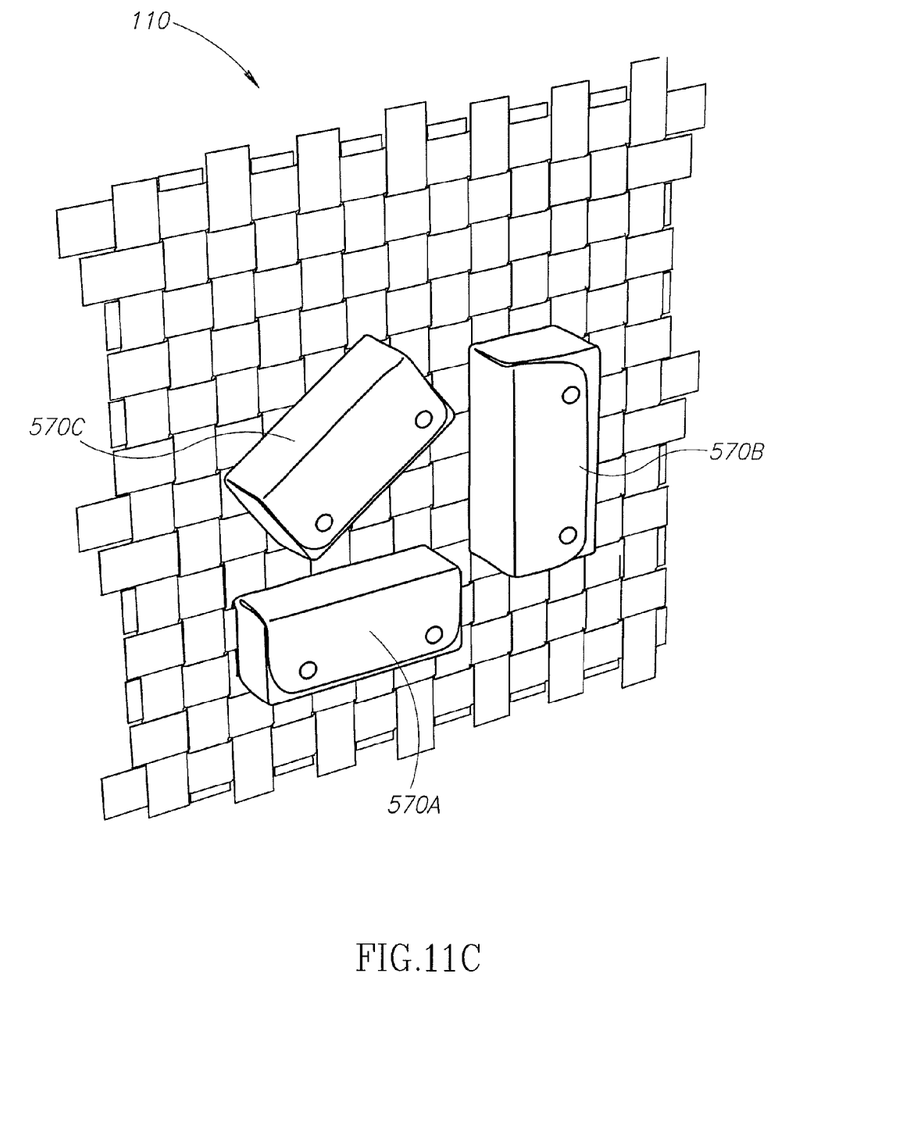

Referring now to FIGS. 11A, 11B and 11C, isometric views of the interwoven material matrix 110 having attached thereto several coupling mechanisms and modular attachment accessories in different orientations, in accordance with various embodiments, is shown. As depicted in FIG. 11A, two straps 500, one possible type of coupling mechanism, are shown in a diagonal orientation without the corresponding modular attachment assembly. While the straps 500 are shown passing through vertical loops of the interwoven material matrix 110, if desired, the straps 500 can be passed through vertical loops, or combinations of vertical and horizontal loops, of the interwoven material matrix 110. FIG. 11A also shows a partially attached modular attachment accessory 510 that is attached to the interwoven material matrix 110 by threading straps 520 through loops 530 of the interwoven material matrix 110 and through straps 540 attached to the rear of the modular attachment accessory 510. As depicted in FIG. 11B, modular attachment accessories 550, 560 and 570 are shown attached in diagonal, vertical and horizontal orientations, respectively, to the interwoven material matrix 110. However, it should be understood that the modular attachment system 100 of the present invention allows each of the modular attachment accessories 550, 560 and 570 to be attached to the interwoven material matrix 110 in any diagonal, vertical or horizontal orientation. As depicted in FIG. 11C, the modular attachment accessory 570 is shown attached to the interwoven material matrix 110 in horizontal (570A), vertical (570B) and diagonal (570C) orientations Additionally, although specific embodiments have been illustrated and described herein, it will be appreciated by those of ordinary skill in the art and others, that a wide variety of alternate and/or equivalent implementations may be substituted for the specific embodiment shown in the described embodiments without departing from the scope of the embodiments described herein. This application is intended to cover any adaptations or variations of the embodiment discussed herein. While various embodiments have been illustrated and described, as noted above, many changes can be made without departing from the spirit and scope of the embodiments described herein.

The embodiments of the invention in which an exclusive property or privilege is claimed are defined as follows:

1. A modular attachment system for a garment to be worn by a person, the system comprising:
   a garment to be worn by a person, the garment having a first side and a second side, the garment being flexible;
   an interwoven matrix of strips secured to at least one of the first side and the second side of the garment, the strips forming a plurality of loops, the matrix including a first set of strips extending in a first direction and a second set of strips extending in a second direction transverse to the first direction, the second set of strips interwoven with the first set of strips, wherein the first set of strips form first loop openings where portions of the first set of strips pass over the second set of strips, and wherein the second set of strips form second loop openings where portions of the second set of strips pass over the first set of strips to form a plurality of loops, whereby the first loop openings and the second loop openings extend in a direction transverse to one another, whereby the first loop openings are at least the same width as the second loop openings;
   wherein each of the strips of the first set of strips and the second of set of strips is made of a woven fabric material, the fabric being woven from at least one material that does not substantially stretch; and
   one or more modular attachment accessories, each of which comprises a coupling mechanism that threads through at least one of the plurality of loops of the matrix and is configured and arranged to form a closed loop around the at least one loop of the matrix to attach the modular attachment accessory to the at least one of the plurality of loops of the interwoven material matrix, wherein the matrix is attached to a flexible backing material or other flexible structure at a perimeter area of the matrix, whereby the first set of strips and second set of strips are substantially void or completely void of attachment to the flexible backing material or other flexible structure along lengths of said sets of strips such that the interwoven strips provide stability to the attached one or more modular attachment accessories.

2. The modular attachment system of claim 1 wherein the interwoven material matrix comprises a plurality of ribbons, ropes or strips of material interwoven to form the plurality of open loops, with a set of loops opening in the first direction and a set of loops opening in the second direction, each of the strips being woven from at least one of nylon, polyester, and polypropylene.

3. The modular attachment system of claim 2 wherein the interwoven strips extending in both the first and second directions have widths from about 5 mm to about 100 mm.

4. The modular attachment system of claim 3 wherein the plurality of fabric strips comprises a first set of fabric strips interwoven in a perpendicular arrangement with a second set of fabric strips to form the plurality of loops opening in two directions.

5. The modular attachment system of claim 4 wherein stitching at opposite peripheral edges of the interwoven matrix is used to secure the first set of fabric strips and the second set of fabric strips in the perpendicular arrangement.

6. The modular attachment system of claim 4 wherein the fabric strips have substantially the same thicknesses and widths.

7. The modular attachment system of claim 4 wherein the fabric strips within the first set of fabric strips and the second set of fabric strips have substantially the same thicknesses but varying widths.

8. The modular attachment system of claim 3 wherein the strips within the first set of strips have substantially the same thicknesses but different widths when compared with the fabric strips within the second set of fabric strips.

9. The modular attachment system of claim 3 wherein the strips range from about 5 millimeters to about 100 millimeters in width and from about 0.1 millimeter to about 5 millimeters in thickness.

10. The modular attachment system of claim 1 wherein the strips are attached to the backing material proximate ends of the strips, the loops being defined generally by a strip crossing over or under an adjacent strip.

11. The modular attachment system of claim 1 wherein the backing material is a waterproof or water resistant material.

12. The modular attachment system of claim 1 wherein the backing material is a mesh material.

13. The modular attachment system of claim 1 wherein the other structure is pouch.

14. The modular attachment system of claim 1 wherein the other structure is body armor.

15. The modular attachment system of claim 1 wherein the other structure is a backpack.

16. The modular attachment system of claim 1 wherein the other structure is a vest.

17. The modular attachment system of claim 1 wherein the modular attachment accessory is selected from the group consisting of a pouch, a clip, a bladder, a badge, a holster, a pocket, a tray, an organizer, an electronic device, a body armor addition and/or a body armor extension, the accessory being attachable to the matrix in a plurality of orientations by selective attachment to loops open in either the first or second direction.

18. The modular attachment system of claim 1 wherein the coupling mechanism comprises hooks, straps, buttons, clips, snaps or carabiners or combinations thereof, the coupling mechanism being engagable with the loops in either the first or second directions such that the accessory is attachable in a plurality of straight, sideways, or angular orientations to the matrix.

19. An item for wearing by a person and having a portion including an interwoven material matrix for receiving accessory attachments in a plurality of orientations, the matrix comprising a first set of fabric strips extending in a first direction in an interwoven manner with a second set of fabric strips extending in a second direction, wherein the first set of strips form first loop openings where portions of the first set of strips pass over the second set of strips, and wherein the second set of strips form second loop openings where portions of the second set of strips pass over the first set of strips to form a plurality of loops, whereby the first loop openings and the second loop openings extend in a direction transverse to one another, the strips ranging from about 5 millimeters to about 100 millimeters in width, wherein the strips are each made of a woven fabric material, and wherein the matrix is attachable to a flexible backing material or other flexible structure at a perimeter area of the matrix, whereby the first set of strips and second set of strips are substantially void or completely void of attachment to the flexible backing material or other flexible structure along lengths of said sets of strips, such that a coupling mechanism of one of the accessory attachments is threadable through at least one of the first loop openings or the second loop openings of the matrix to form a closed loop around the at least one of the first loop openings or the second loop openings to attach the accessory attachment to the at least one of the first loop openings or the second loop openings of the matrix.

20. The interwoven material matrix of claim 19 wherein the fabric strips have substantially the same thicknesses and widths.

21. The interwoven material matrix of claim 19 wherein the fabric strips within the first set of fabric strips and the second set of fabric strips have substantially the same thicknesses but varying widths.

22. The interwoven material matrix of claim 19 wherein the fabric strips within the first set of fabric strips have substantially the same thicknesses but different widths when compared with the fabric strips within the second set of fabric strips.

23. The interwoven material matrix of claim 19 wherein the fabric strips range from about 0.1 millimeter to about 5 millimeters in thickness.

24. The interwoven material matrix of claim 19 wherein the strips are secured at their ends to the backing material or other structure, ends of each of the loops being formed by strips in a first direction crossing under strips in a second direction, one of the loops being stitched to the backing material or other structure.

25. The interwoven material matrix of claim 19 wherein each of the fabric strips are woven from at least one of nylon, polyester or polypropylene.

26. An item to be worn by a person having a modular attachment system for securing an accessory attachment, the system comprising:
    an interwoven material matrix which comprises a first set of fabric strips interwoven in a substantially perpendicular arrangement with a second set of fabric strips, wherein the first set of strips form first loop openings where portions of the first set of strips pass over the second set of strips, and wherein the second set of strips form second loop openings where portions of the second set of strips pass over the first set of strips to form a plurality of loops, whereby the first loop openings and the second loop openings extend in a direction transverse to one another;
    wherein each of the first set of strips and the second of strips are made of a woven fabric material, including at least one of nylon, polyester, and polypropylene; and
    one or more modular attachment accessories, each of which comprises a coupling mechanism that threads through at least one of the plurality of loops of the matrix and is configured and arranged to form a closed loop around the at least one loop of the matrix to attach the modular attachment accessory to the at least one of the plurality of loops of the interwoven material matrix in any of a plurality of orientations, depending on which loops the coupling mechanism is secured to, wherein the matrix is attached to a flexible backing material or other flexible structure at a perimeter area of the matrix, whereby the first set of strips and second set of strips are substantially void of attachment to the flexible backing material or other flexible structure along lengths of said sets of strips such that the interwoven strips provide stability to the attached one or more modular attachment accessories.

27. A method of attachment to an item worn by a person comprising:
    providing an interwoven material matrix which comprises a first set of fabric strips extending generally in a first direction interwoven in a generally perpendicular arrangement with a second set of fabric strips extending in a second direction, wherein the first set of strips form first loop openings where portions of the first set of strips pass over the second set of strips, and wherein the second set of strips form second loop openings where portions of the second set of strips pass over the first set of strips to form a plurality of loops, whereby the first loop openings and the second loop openings extend in a direction transverse to one another, wherein each of the strips of the first set of fabric strips and the second of fabric strips are made of a woven fabric material;
    attaching the matrix to a backing material or other structure only at a perimeter area of the matrix;
    providing one or more modular attachment accessories, each of which comprises a coupling mechanism that threads through at least one of the plurality of loops of the matrix and is configured and arranged to form a closed loop around the at least one loop of the matrix to attach the modular attachment accessory to the at least one of the plurality of loops in either direction of the interwoven material matrix; and
    attaching the one or more modular attachment accessories using the coupling mechanism to one or more of the plurality of loops of the interwoven material matrix.

\* \* \* \* \*